United States Patent
Thompson et al.

(10) Patent No.: US 6,758,624 B2
(45) Date of Patent: Jul. 6, 2004

(54) COUPLING DEVICE INCORPORATING A SECURITY FEATURE

(75) Inventors: Philip Hugh Thompson, Tulsa, OK (US); James Kevin Hays, Broken Arrow, OK (US)

(73) Assignee: Productivity Paradigm Technologies, Inc., Broken Arrow, OK (US)

(*) Notice: Subject to any disclaimer, the term of this patent is extended or adjusted under 35 U.S.C. 154(b) by 16 days.

(21) Appl. No.: 10/056,639

(22) Filed: Oct. 25, 2001

(65) Prior Publication Data

US 2002/0136600 A1 Sep. 26, 2002

Related U.S. Application Data

(60) Provisional application No. 60/278,404, filed on Mar. 24, 2001.

(51) Int. Cl.[7] ................ F16B 2/02; F16B 7/04
(52) U.S. Cl. ............... 403/311; 403/111; 403/79; 403/100; 403/161
(58) Field of Search ............. 403/79, 100, 111, 403/113, 116, 119, 150, 157, 161, 292, 311, 162, 293, 331, 335, 337, 338, 339, 340; 280/507

(56) References Cited

U.S. PATENT DOCUMENTS

| | | | | |
|---|---|---|---|---|
| 2,785,564 A | * | 3/1957 | Rossi | |
| 3,580,612 A | * | 5/1971 | Pearson | |
| 3,874,029 A | * | 4/1975 | McCullough | 16/329 |
| 3,982,413 A | * | 9/1976 | Stone et al. | |
| 4,361,342 A | * | 11/1982 | Duffield | |
| 4,493,134 A | * | 1/1985 | Karr | 403/311 |
| 4,596,484 A | | 6/1986 | Nakatani | |
| 4,657,275 A | * | 4/1987 | Carroll | |
| 4,683,613 A | * | 8/1987 | Starke | 16/262 |
| 4,730,841 A | * | 3/1988 | Ponder | |
| 4,792,151 A | * | 12/1988 | Feld | |
| 4,903,978 A | * | 2/1990 | Schrum, III | |
| 5,000,067 A | | 3/1991 | Kolbusz | |
| 5,154,043 A | * | 10/1992 | Schemelin et al. | |
| 5,348,333 A | | 9/1994 | Gee | |
| 5,359,866 A | * | 11/1994 | Boddy | |
| 5,465,993 A | | 11/1995 | Gee | |
| 5,725,233 A | | 3/1998 | Gee | |
| 5,727,806 A | * | 3/1998 | McCoy et al. | |
| 5,735,539 A | | 4/1998 | Kravitz | |
| 5,752,398 A | | 5/1998 | Villalon, Jr. | |
| 5,775,139 A | * | 7/1998 | Sellers | |
| 5,794,961 A | | 8/1998 | Niswangia | |
| 5,897,126 A | | 4/1999 | Morris | |
| 5,937,679 A | | 8/1999 | Villalon, Jr. | |
| 6,027,134 A | | 2/2000 | Hart | |
| 6,062,583 A | * | 5/2000 | Lauricella, Jr. | |
| 6,068,282 A | | 5/2000 | Floe | |
| 6,070,441 A | | 6/2000 | Bernstrom | |
| 6,186,532 B1 | | 2/2001 | Ray | |
| 6,308,977 B1 | * | 10/2001 | Pulliam et al. | |
| 6,364,337 B1 | * | 4/2002 | Rowland et al. | |
| 6,382,653 B1 | * | 5/2002 | Bass | |

* cited by examiner

Primary Examiner—Lynne H. Browne
Assistant Examiner—Victor MacArthur

(57) ABSTRACT

Presented is a trailer incorporating a device that allows the detachable coupling of the ball coupler and safety chains of a trailer for remote storage of these items, while incorporating a security feature that allows only the original ball coupler and safety chains to be connected. This deters the unauthorized towing or theft of the trailer.

3 Claims, 11 Drawing Sheets

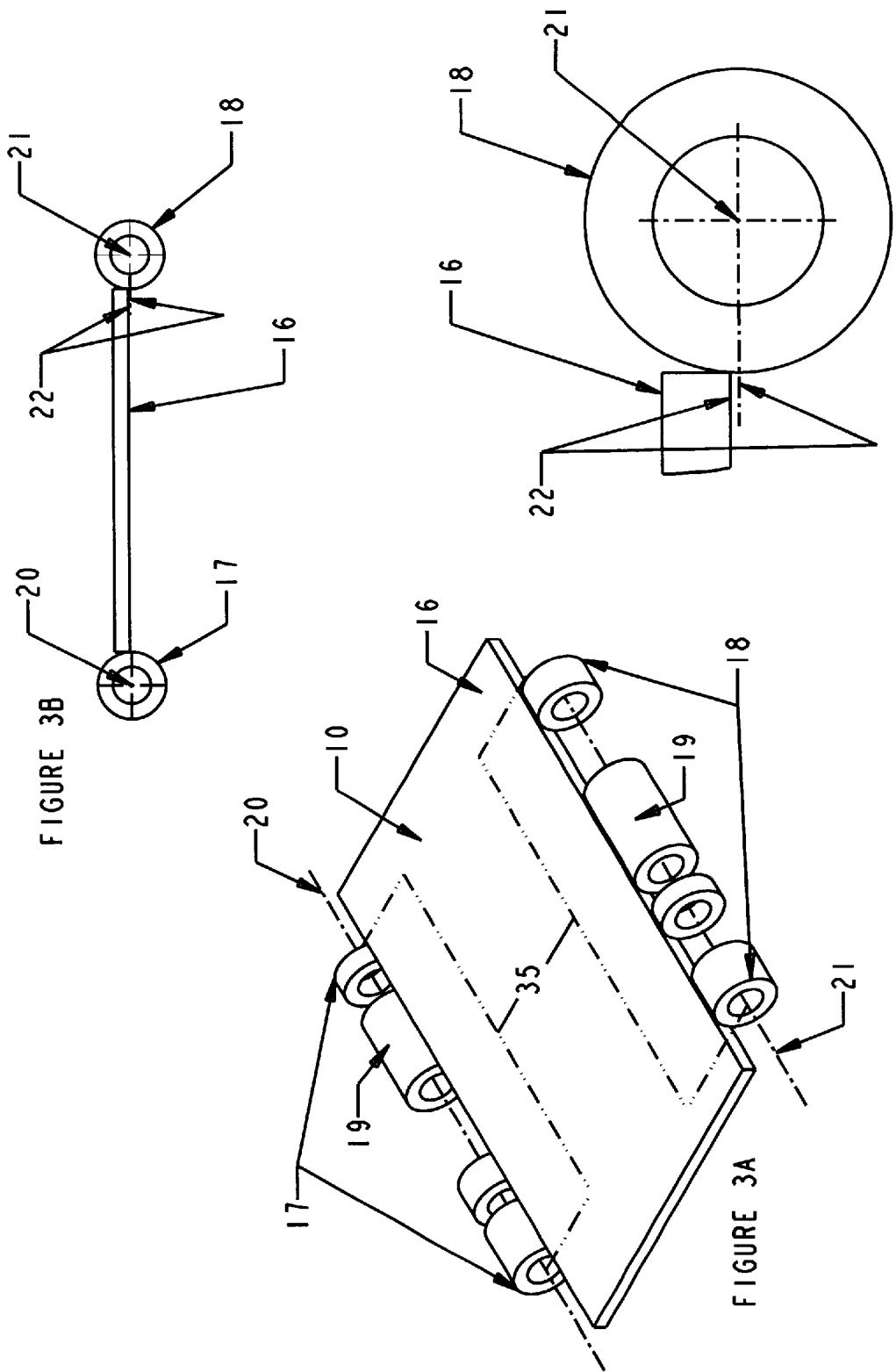

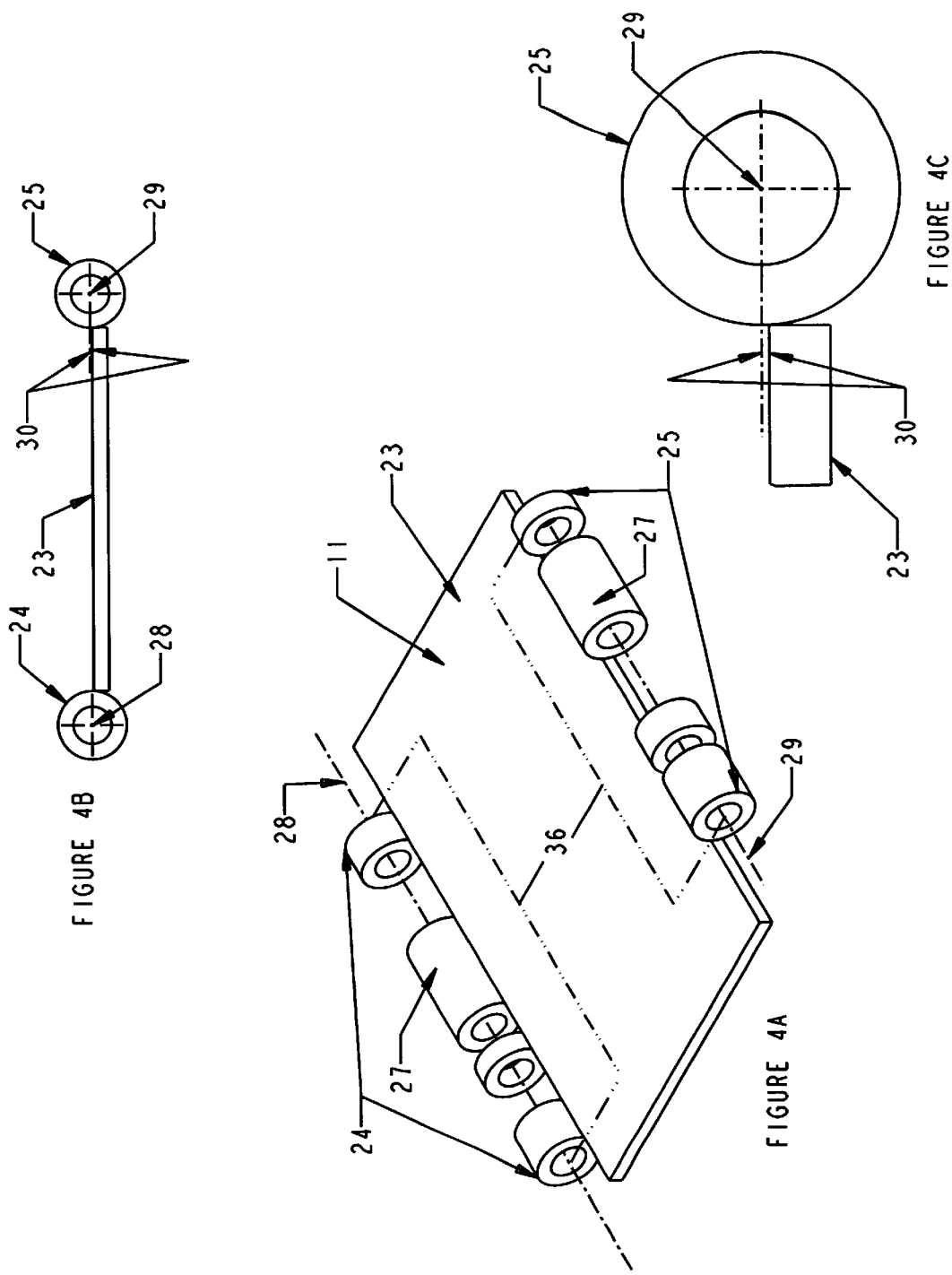

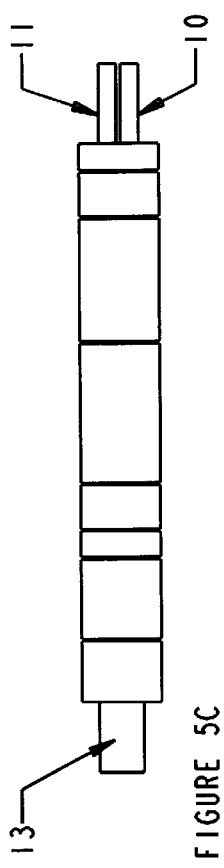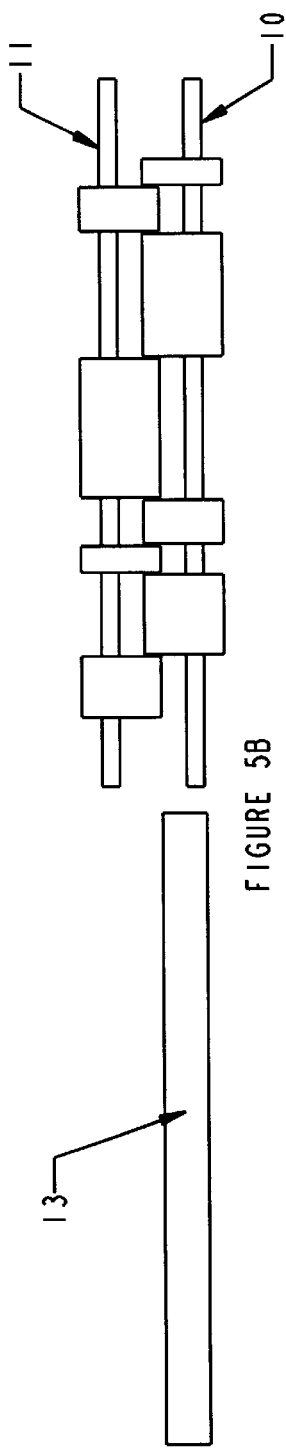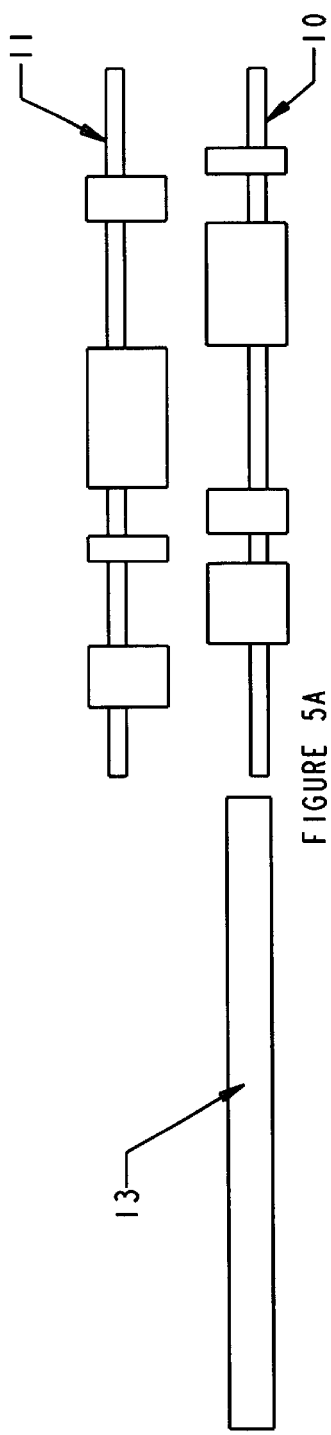

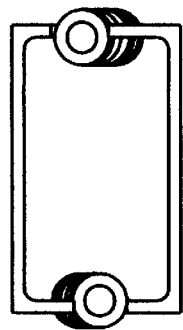
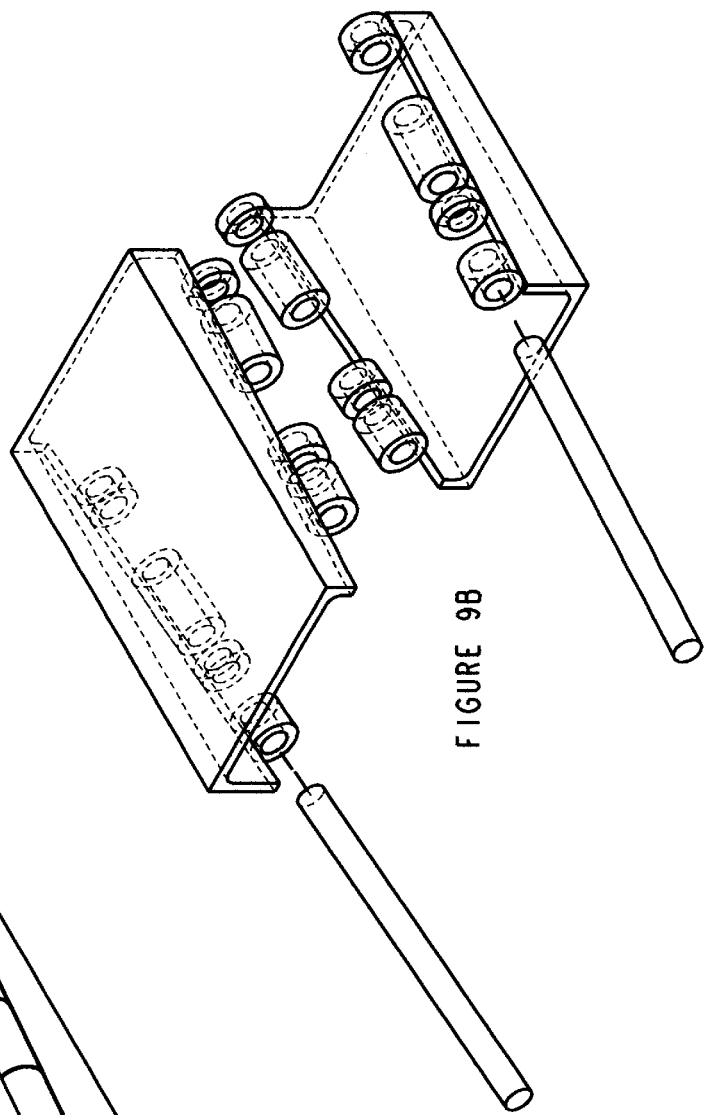
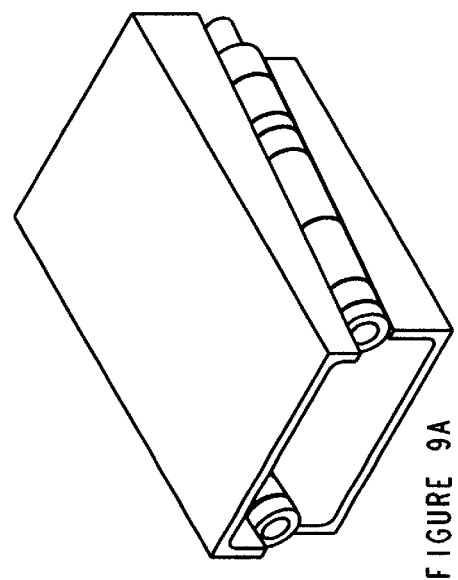

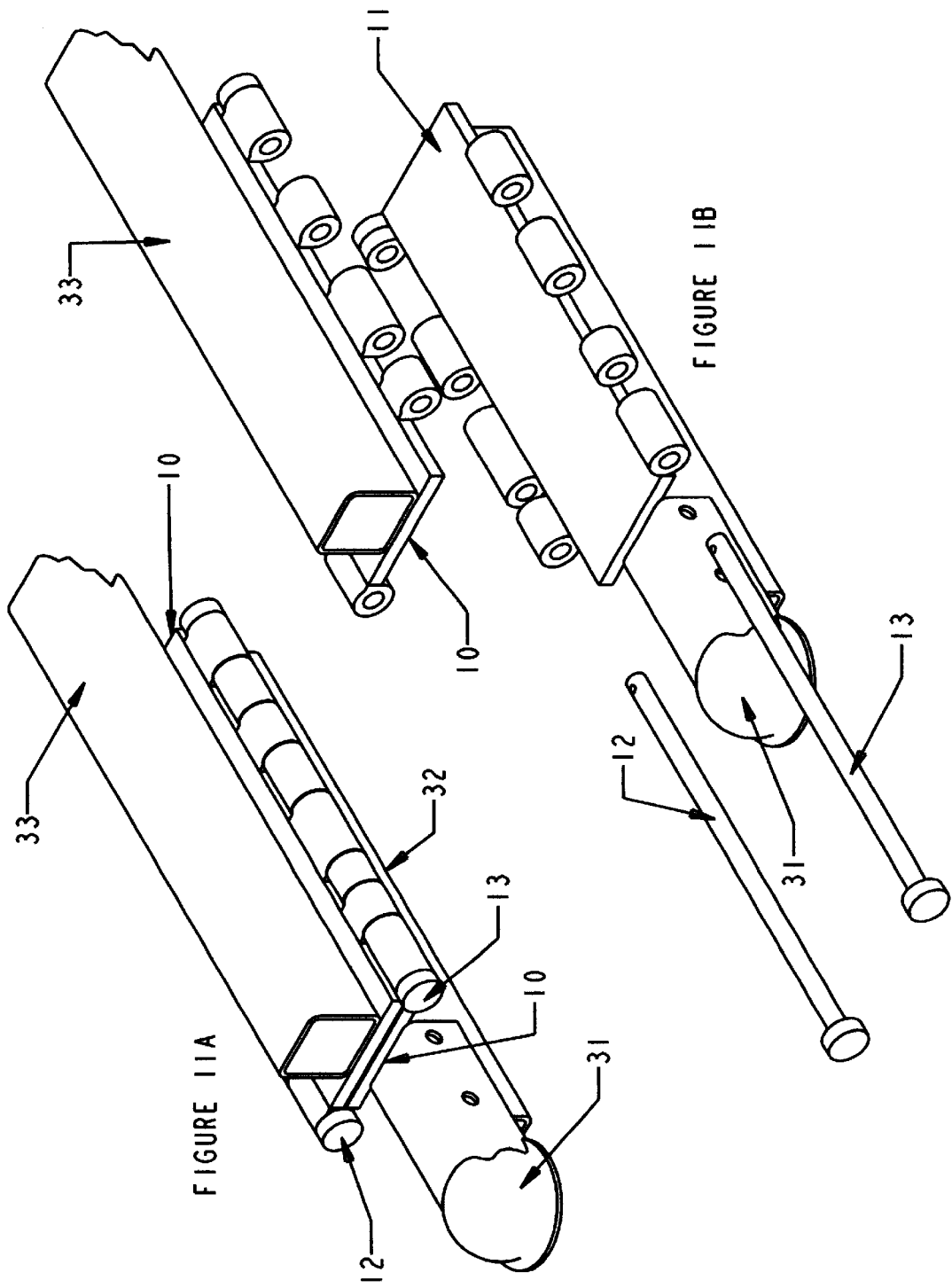

COUPLING DEVICE INCORPORATING A SECURITY FEATURE

We hereby claim benefit of U.S. Provisional Patent Application No. 60/278404 filed Mar. 24, 2001.

BACKGROUND OF THE INVENTION

This invention relates to trailers, and the deterrence of towing of the trailer, for the purposes of preventing theft or unauthorized towing. More particularly, this invention relates to accomplishing the deterrence of towing the trailer by providing a means by which a portion of the tongue or drawbar of the trailer containing the ball coupler and safety chains of the trailer may be removed and remotely stored away from the trailer. Still more particularly, this invention relates to providing the means to remove the structure containing the ball coupler and safety chains, while deterring the attachment of another such structure from another trailer, by providing a security feature that allows only the reattachment of the original ball coupler and safety chain bearing structure to the trailer, and forcing an improvisation of the towing means in order to attempt to tow trailer without the original ball coupler and safety chain bearing structure being attached to the trailer.

Trailer hitches are added to vehicles such as automobiles and pickup trucks to provide the capability of towing another vehicle such as a trailer. These trailer hitches consist of a mount that is attached to the vehicle and a trailer hitch ball. Trailers are equipped with a tongue that has a ball coupler to grasp the trailer hitch ball, while permitting pivotal movement of the ball coupler on the ball. The trailer is also equipped with safety chains, which provide a measure of safety and backup means of trailer attachment in event of the failure of the ball coupler. Several devices have previously been devised that would deter unauthorized movement or theft of the trailer. These include devices to detach the trailer tongue by slidably engaging the tongue into the trailer frame, and devices to cover the ball coupler.

Devices that allow the trailer tongue to be detached by slidably engaging the tongue into the trailer frame do not provide any security features that allow only matched tongues to be attached to a trailer. Any person with a like-equipped trailer tongue can attach such tongue to any so equipped trailer and use it in a conventional manner. Once these devices are defeated, the trailer can be used in a conventional manner by towing with a vehicle equipped with a ball trailer hitch.

Devices that cover the socket member to prevent grasping of the trailer ball are also of limited use in deterring trailer theft. These devices are easily defeated by simple cutting tools, or by a sledgehammer blow that deforms the engaging member of the ball coupler and allows easy removal of the device. Once the device is removed, the trailer is then free to be used in a conventional manner by anyone with a vehicle equipped with a ball hitch.

U.S. Pat. No. 5,000,067 discloses a secure locking device that is formed with a U-shaped member and a compatible bar for the U-shaped member. The U-shaped member has a female threaded end and female locking end. The bar has a male threaded end and a female key-receiving end. Use of ordinary cutting tools can defeat this device. Once the device is removed, the existing tongue assembly may be reinstalled using a common bolt connection, thus allowing conventional towing of the trailer.

U.S. Pat. Nos. 5,348,333, 5,465,993 and 5,725,233 disclose a portable (removable) tongue for connecting a house trailer to a towing vehicle for towing the trailer from one location to another with the tongue being adapted for easy and rapid disconnection from the towing vehicle and trailer. The tongue is adapted to be attached to, and removed from, the frame that supports a house trailer. The tongue is adapted to be readily secured to the frame of the trailer for towing purposes and easily removed from the frame of the trailer while the trailer is parked in a trailer court for living purposes. These devices do not incorporate any security feature to prevent a tongue intended for use on one trailer to be used on other trailers similarly equipped.

U.S. Pat. No. 5,794,961 discloses an anti-theft device that can be used on different size trailer tongues of the type having a socket for receiving a tow ball of a trailer hitch. This device can quickly be defeated by the use of cutting tools that then allows the trailer to be towed in a normal manner using a ball trailer hitch on a towing vehicle. There is no feature that disables the trailer if the device is not present or defeated.

U.S. Pat. No. 5,897,126 discloses a coupling assembly for a trailer hitch that has a sleeve member mounted on the tongue of a trailer and constituting an extension thereof. A removable coupling member is detachably attached to a hitch, wherein the coupling member slidably engages with the sleeve member and is movable between a rear locking position and a forward detaching position that detaches the coupling member from the sleeve member. There are no security features incorporated to prevent the unauthorized towing of a trailer so equipped by installing a similarly equipped tongue by unauthorized persons and towing the trailer away.

U.S. Pat. No. 5,937,679 discloses an anti-theft device that locks on to the trailer coupler and covers the receptacle of the coupler, thereby preventing the insertion of a hitch ball or other towing means into the receptacle. This device can be removed by deformation of the engaging lip of the device using cutting tools or by deformation of the engaging lip from repeated hammer blows. Once the device is removed, the trailer can then be towed conventionally by a vehicle equipped with a ball hitch.

U.S. Pat. No. 6,027,134 discloses a removable trailer tongue for use with a towing vehicle and a trailer frame equipped with hydraulic brakes. This invention fails to disclose any security features to prevent the installation of a mating tongue to then allow the trailer to be towed by a vehicle equipped with a ball hitch.

U.S. Pat. No. 6,364,337 discloses a system that may be used to convert a standard trailer into a trailer having a pivoting hitch tongue that is movable between a stowed position and a towing position for the purpose of shortening the trailer for storage. This invention discloses no security feature to prevent a person with a tongue and coupler equipped with the disclosed device from connecting to any trailer equipped with the disclosed device in a conventional manner.

It is therefore desirable to provide a feature to a trailer to allow shortening of the trailer or removal of the trailer coupler for storage. Furthermore, it is desirable to deter theft of trailers. The novelty and improvement in the art of the disclosed device is that said device provides the utility of the removal of the portion of the trailer tongue containing the trailer ball coupler and trailer safety chains for the purpose of more compact storage of the trailer. Said device also renders the trailer unusable by removal of the trailer ball coupler and trailer safety chains. Only the original tongue structure can be reattached to make the trailer usable. A similarly equipped tongue could not be installed on a trailer using the disclosed device, unless it was matched to that specific trailer's security feature. As the means of conventionally towing the trailer has been removed, an improvised towing means is required in order to tow the trailer, or great efforts and expense must be spent to re-create a single matching tongue and coupler that could be used to steal only the single trailer equipped with the disclosed device. This improvised towing means would project a probable cause to mobile law enforcement officials to investigate and perhaps catch the act of stealing the trailer while it is in progress.

SUMMARY OF THE INVENTION

Therefore, it is an objective of this invention to provide a trailer incorporating a coupling device that allows the removal of the trailer ball coupler and trailer safety chains, and allows the remote storage thereof.

A further objective of this invention is to provide a security feature within a coupling device, such that the members of the coupling device comprise a matched coupling pair, and either of these members cannot be coupled with an unmatched member.

Still another objective of this invention is to provide a coupling device that allows the coupling of the trailer tongue to a trailer so that only a matched tongue and trailer combination may be used together, in order to deter towing of the trailer by using a similarly equipped tongue from another trailer, or to assure that only a properly sized or equipped tongue is used with a specific trailer.

Yet another objective of this invention is to provide a method of rendering the trailer unusable in a conventional towing manner due to the absence of the tongue, safety chains and ball coupler and the inability to replace the tongue, ball coupler and safety chains with a similarly equipped, but unmatched tongue and ball coupler from another trailer.

These and other objectives of this invention including, but not limited to the objectives above, are met by providing a trailer incorporating a coupling device comprising a base member, a coupling member and two coupling pins.

The base member comprises a base plate and a security feature attached thereto, said security feature comprising two tube element sets, each tube element set comprising a plurality of coaxially aligned tube elements, the tube elements being of varied lengths and spacing along the tube element center axis, the internal diameters of the tube elements being the same and sized to insert the coupling pin, and the front and back surfaces of the tube elements being normal to the tube element set center axis, or being beveled on a plane constructed at an angle to the tube element set center axis.

The coupling member comprises a base plate and a complimentary security feature attached thereto, said complimentary security feature comprising two tube element sets, each tube element set comprising a plurality of coaxially aligned tube elements, the tube elements being of a length and spacing along the tube element axis to allow a mesh interface with the respective tube elements of the base member tube set when the respective tube sets of the base member and the coupling member are coaxially aligned, the internal diameters of the tube elements being the same and sized to insert the coupling pin. The end surfaces of the tube elements are parallel to the end surfaces of the meshing tube elements of the base member assembly.

Two coupling pins assemble the coupling device together when the tube sets of the base member are coaxially aligned with the respective tube elements of the coupling member and the pin is slid through the meshed sets of tubes to couple the two members together. An end cap, external to the end set of tube elements opposite the pin insertion end of the tube element set on each coupling member, prevents the device from being defeated by use of coupling pins longer than the tube set length and using the external exposed surfaces of the pin to attach an external coupling device of some kind. Further security may be provided by varying the internal diameter of the tube element sets and the external diameter of the coupling pins, such that only coupling pins that match the diameter of the tube element sets for a given device can be used to successfully couple the base member and coupling member.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is now described by way of examples with reference to the accompanying drawings in which:

FIG. 3A is an isometric view of the base member of the coupling device shown in FIG. 1.

FIG. 3B is a front view of the base member of FIG. 3A showing the relationship of the tube element position to the base plate of the base member.

FIG. 3C is a partial view of FIG. 3B providing a closer view of the relationship shown in FIG. 3B.

FIG. 4A is an isometric view of the coupling member of the coupling device shown in FIG. 2.

FIG. 4B is a front view of the coupling member of FIG. 4A showing the relationship of the tube element position to the base plate of the coupling member.

FIG. 4C is a partial view of FIG. 3B providing a closer view of the relationship shown in FIG. 3B.

FIG. 5a is a side view of the coupling device in FIG. 2 shown in a position where the device is ready to be coupled.

FIG. 5b is a side view of the coupling device in FIG. 2 showing the mesh of the tube elements of the base member and the coupling member.

FIG. 5c is a side view of the coupling device in FIG. 2 shown in the coupled position with the pin inserted.

FIG. 9A is an isometric view of another embodiment of the coupling device where the tube element set alignment axes lie in parallel planes, but are not coplaner.

FIG. 9B is an exploded isometric view of the embodiment shown in FIG. 9A

FIG. 9C is an end view of the embodiment shown in FIG. 9A.

FIG. 11A is an isometric view of an embodiment of the device being used to attach a ball coupler and tongue to an existing trailer tongue.

FIG. 11B is an exploded view of FIG. 11A.

DETAILED DESCRIPTION OF THE INVENTION

Figure 1:
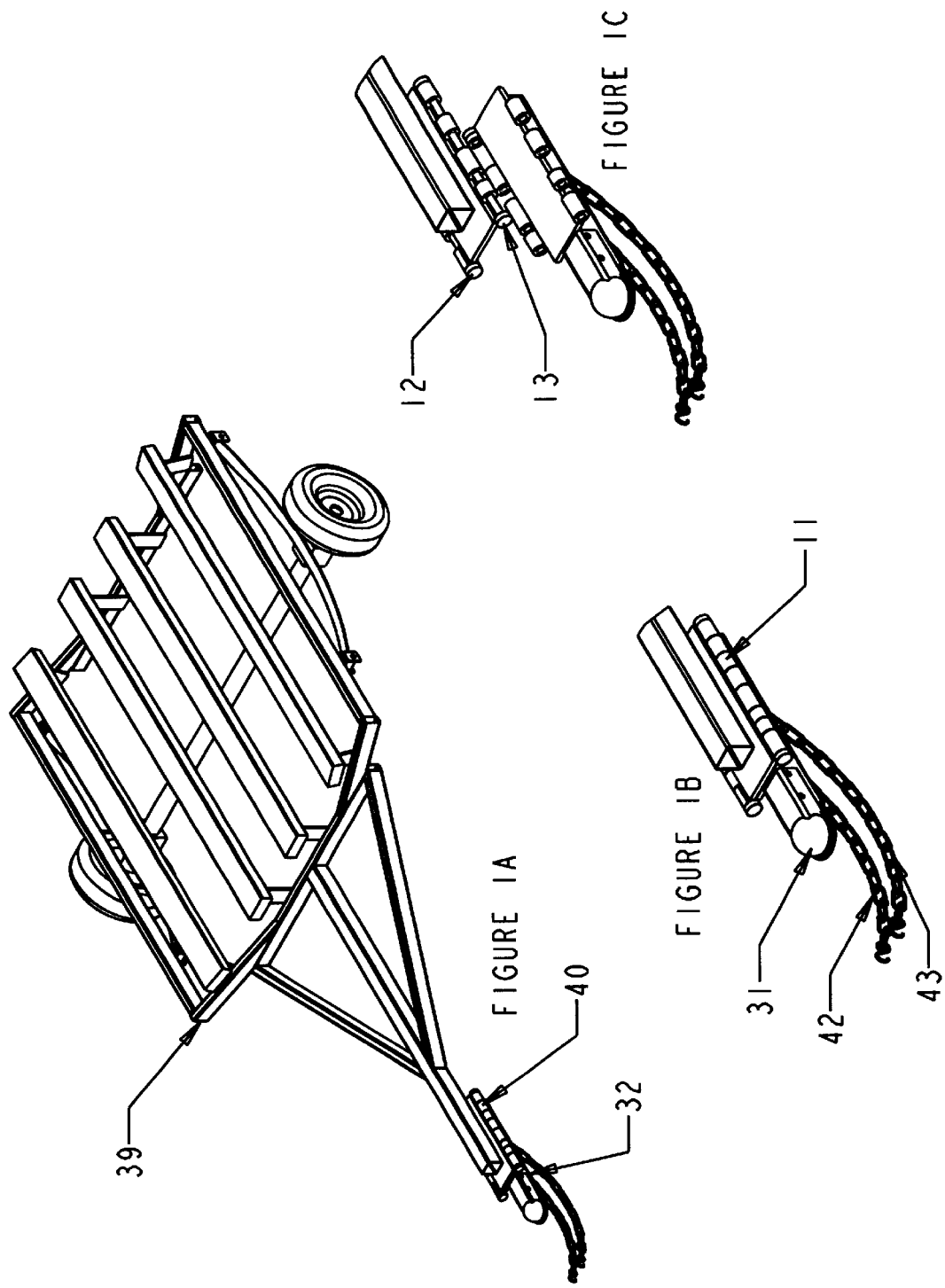
FIG. 1A is an isometric view of the trailer incorporating the coupling device shown in the coupled state.
FIG. 1B is a partial view of the FIG. 1A showing the coupling device, ball coupler, safety chains and tongue structure.
FIG. 1C is a partial view of FIG. 1A showing the coupling device in a disassembled state.

Referring now to the figures, the coupling device will be more fully described. Referring to FIG. 1A, the trailer 39 incorporates a coupling device 40, which attaches a tongue structure 32.

Referring to FIG. 1B, the tongue structure comprises a ball coupler 31, safety chains 42 and 43, and the coupling member 11 of the coupling device.

Referring to FIG. 1C, the coupling device is disassembled by removing the coupling pins 12 and 13, which frees the tongue structure for remote storage.

Figure 2:
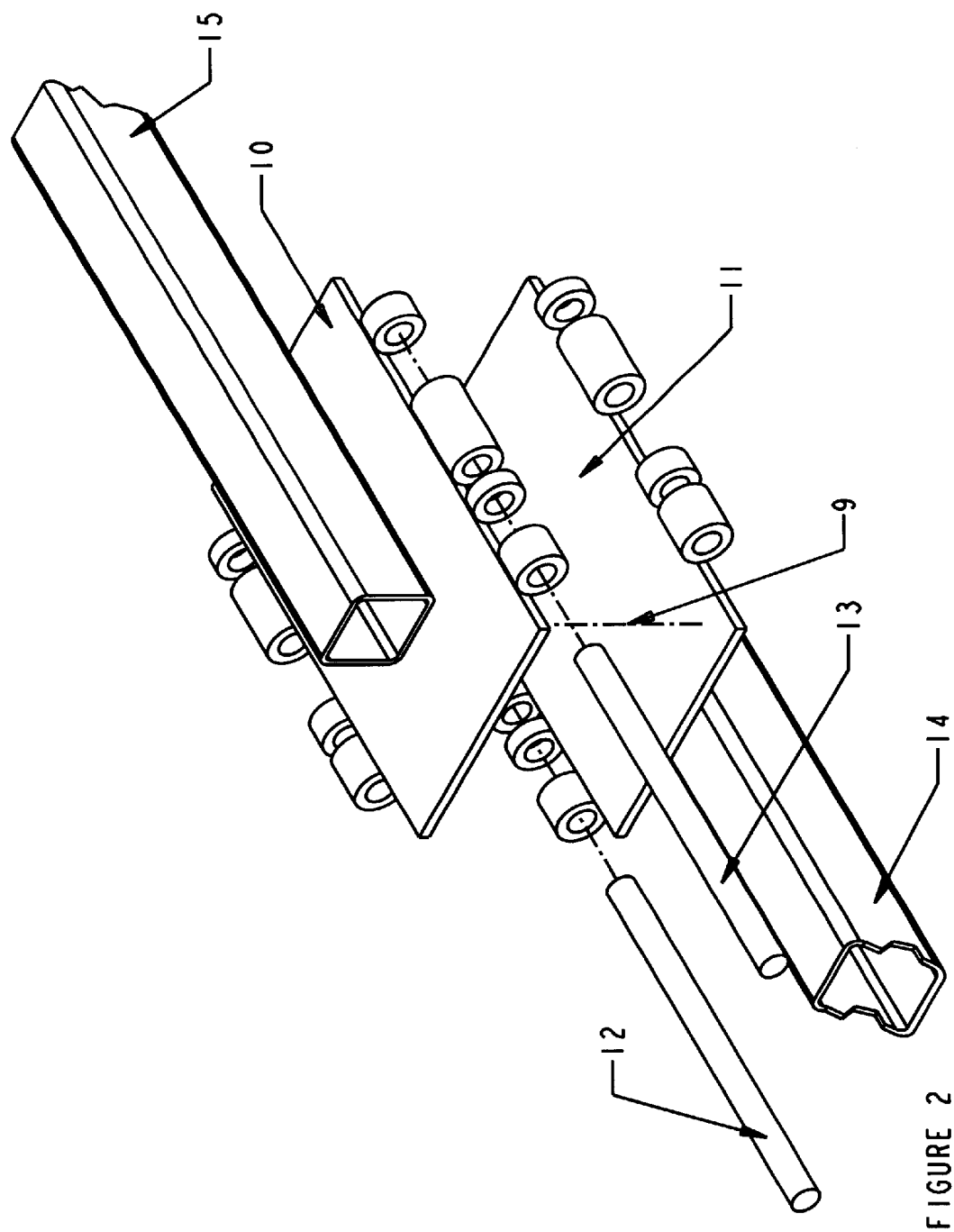
FIG. 2 is an exploded isometric view of the preferred embodiment of the coupling device.

Referring to FIG. 2, the device comprises a base member 10, a coupling member 11 and two coupling pins 12 and 13. The base member is attached a load bearing member 14, which may be a trailer tongue equipped with a ball coupler, and the coupling member is attached to another load bearing member 15, which may be a trailer frame. A coupling direction 16 is defined, said direction being normal to the lower surface of the base member 10.

Referring to FIG. 2A, the base member 10 comprises a rectangular base plate 16 and a security feature 35 attached thereto, said security feature comprising two tube element sets 17 and 18, one tube element set on each side of the base plate 16. Each tube element set 17 and 18 comprise a plurality of tube elements 19 of equal internal diameters, said tube elements being coaxially aligned and of varied lengths and spacing along their respective tube alignment axes 20 and 21. The alignment axes 20 and 21 of each of the two sets of tube element sets 17 and 18 are parallel with the sides of the base plate 16 and normal to the end surface of the base plate 16. Referring to FIG. 2B and 2C, the alignment axes 20 and 21 of the tube element sets 17 and 18 are offset from the bottom surface of the base plate 16 by a gap 22. This gap will allow the eventual coupling of the base member with the coupling member without generating interference in the base plate 16.

Referring to FIG. 3A, the coupling member 11 comprises a base plate 23 and a complimentary security feature 36 attached thereto, said complimentary security feature comprising two tube element sets 24 and 25, one tube element set on each side of the base plate 23. Each tube element set 25 and 26 comprise a plurality of tube elements 27 of equal internal diameters to the base member tube elements 19 shown in FIG. 2A, said tube elements 27 being coaxially aligned and of lengths and spacing along their respective tube alignment axes 28 and 29 so that the tube elements mesh with the tube elements of the respective base member tube element sets 18 and 19, as shown in FIG. 4B. The alignment axes 28 and 29 of each of the two sets of tube element sets 17 and 18 are parallel with the sides and normal to the end surface of the base plate 23. Referring to FIG. 3B. and 3C., the alignment axes 28 and 29 of the tube element sets 24 and 25 are offset from the bottom surface of the base plate 23 by a gap 30. This gap will allow the eventual coupling of the base member with the coupling member without generating interference in the base plate 23.

Figure 6B:
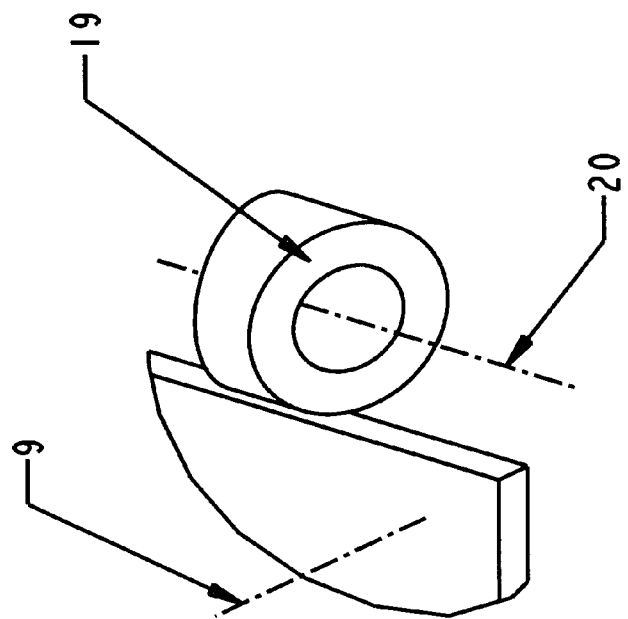
FIG. 6B is a partial isometric view of the end surface of a tube element beveled on a plane through an axis perpendicular to the coupling direction.
Figure 6A:
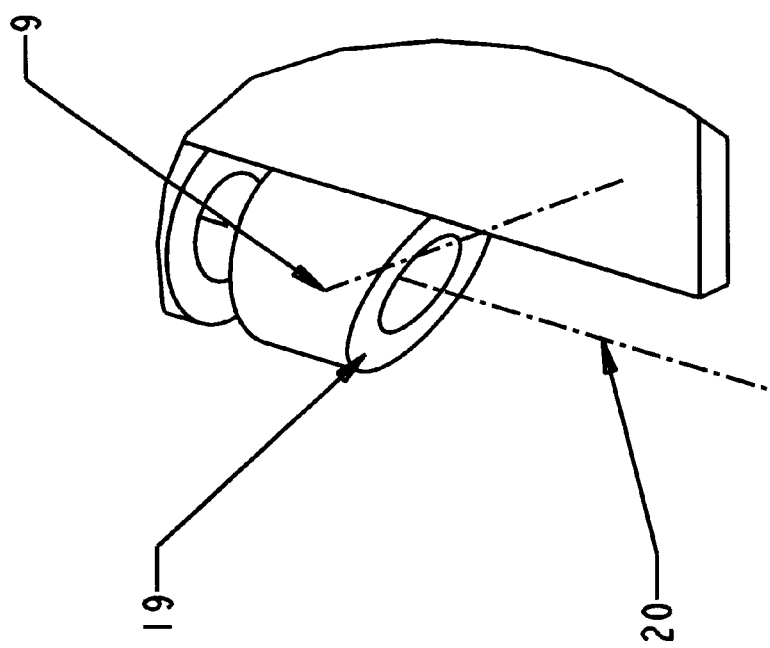
FIG. 6A is partial isometric view of the end surface of a tube element beveled on a plane through an axis parallel to the coupling direction.
Figure 7:
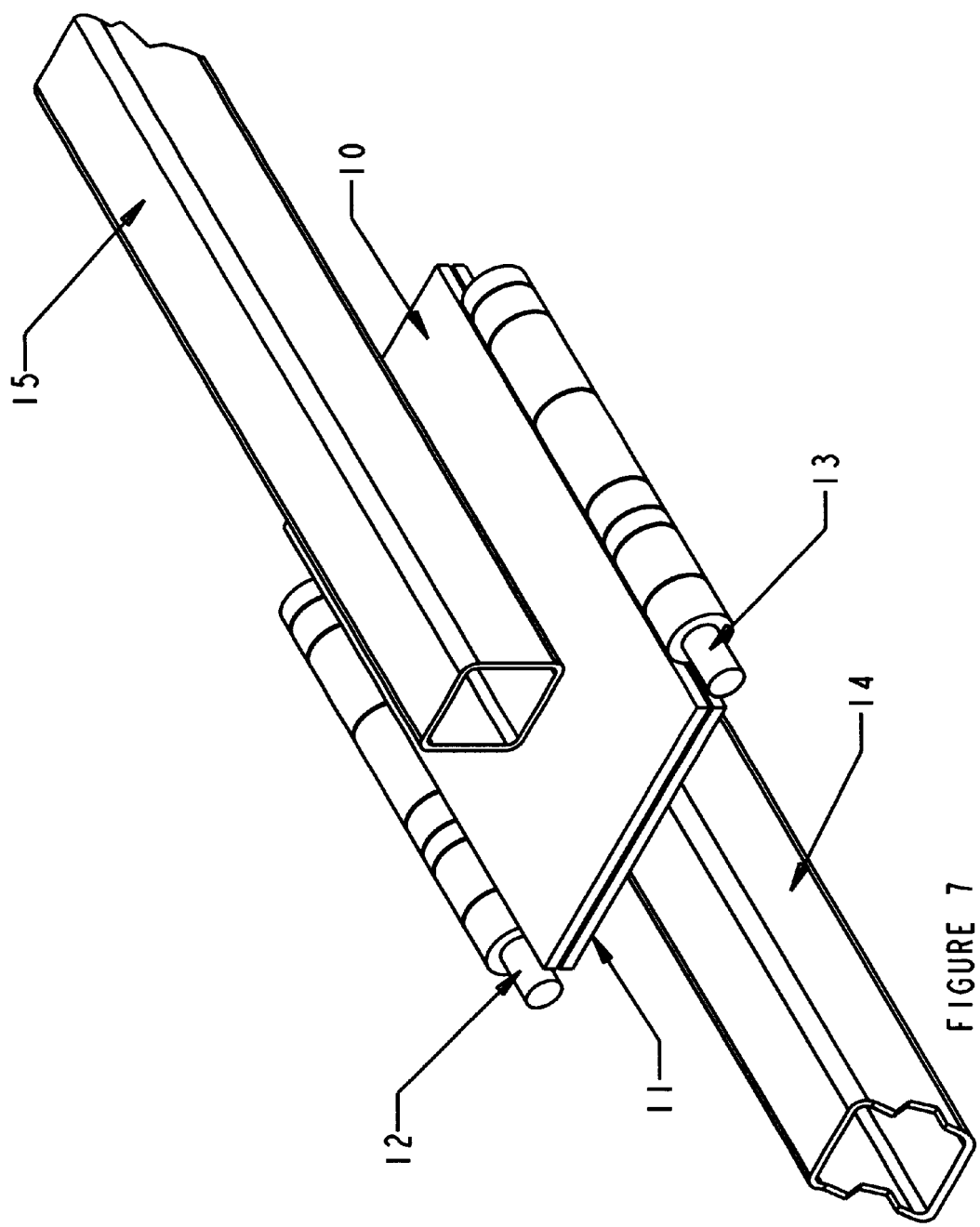
FIG. 7 is an isometric view of the coupling device of FIG. 2 in the coupled position.

Referring to FIG. 5A, the base member 10 and coupling member 11 are joined by aligning the members longitudinally so that the meshing of the tube elements sets as previously described is achieved, as shown in FIG. 4B. Once this mesh is achieved, the base member and coupling member are aligned laterally to achieve a coaxial alignment of the tube element sets of the base member and the coupling member. The coupling pins 12 and 13 are then inserted through the coaxially aligned inner diameters of the meshing tube elements to achieve the coupling, as shown in FIG. 4C and FIG. 6.

Referring to FIG. 1, FIG. 5A and FIG. 5B, the ends of the individual tube elements of the tube element sets may be normal to their respective tube element set center axes 20, 21, 28, or 29 or may be angled on a plane through an axis parallel to the coupling direction 9 and intersecting said respective tube element set axis, or angled on a plane through an axis intersecting said tube element set axis and perpendicular to the coupling direction axis 9.

The security feature of the device is accomplished by the varied spacing, lengths and end surface bevels of the tube elements of the tube element sets 17 and 18 of the base member 10, and the need to have a specifically matched attaching member 11 in order to coaxially align both sets of tube sets of the base member 10 and the coupling member 11, and insert the coupling pins 12 and 13 to accomplish the coupling of the device. This feature can further be accomplished by varying the internal diameter of the tube element sets 17 and 18, requiring the use of coupling pins 12 and 13 of matched external diameters to the corresponding tube element sets 17 and 18 to accomplish the coupling of the coupling member 11 to the base member 10.

Figure 8C:
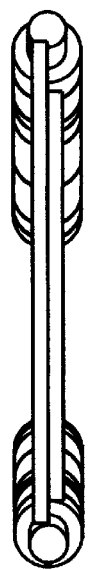
FIG. 8C is an end view of the embodiment shown in FIG. 8A.
Figure 8B:
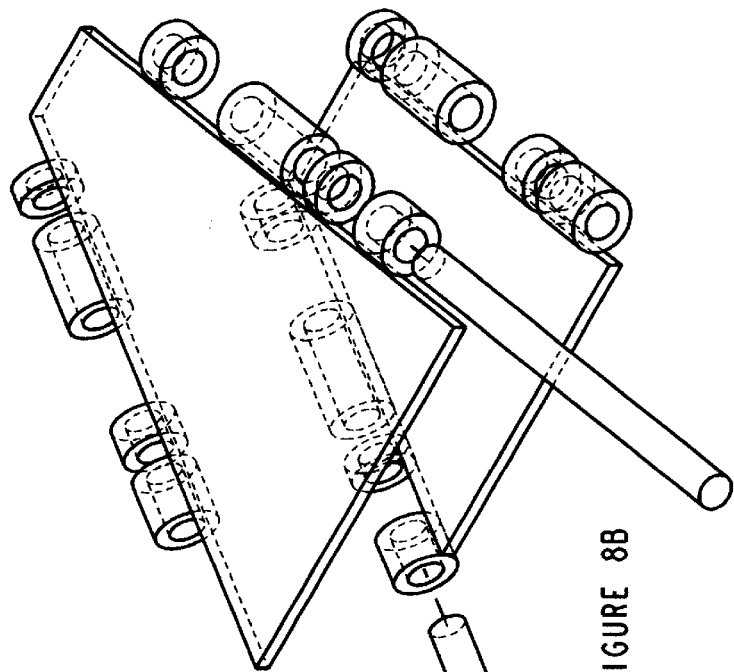
FIG. 8B is an exploded isometric view of the embodiment shown in FIG. 8A
Figure 8A:
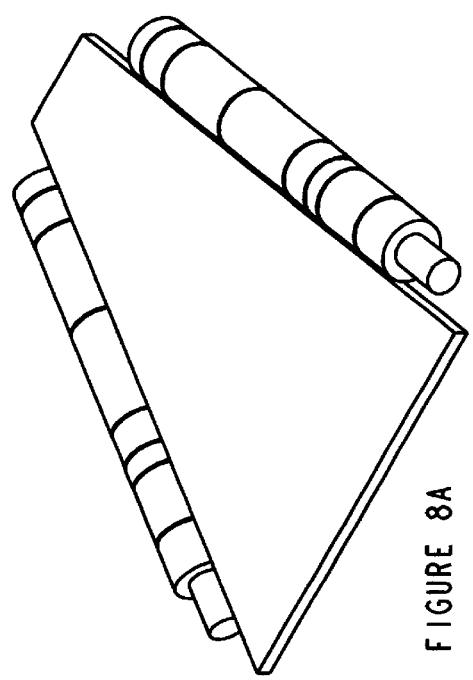
FIG. 8A is an isometric view of another embodiment of the coupling device where the tube element set alignment axes are planer, but not parallel.
Figure 10C:
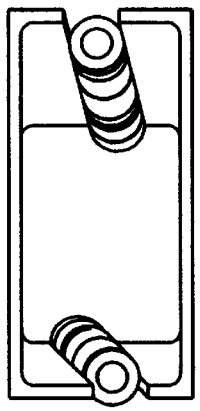
FIG. 10C is an end view of the embodiment shown in FIG. 10A.
Figure 10B:
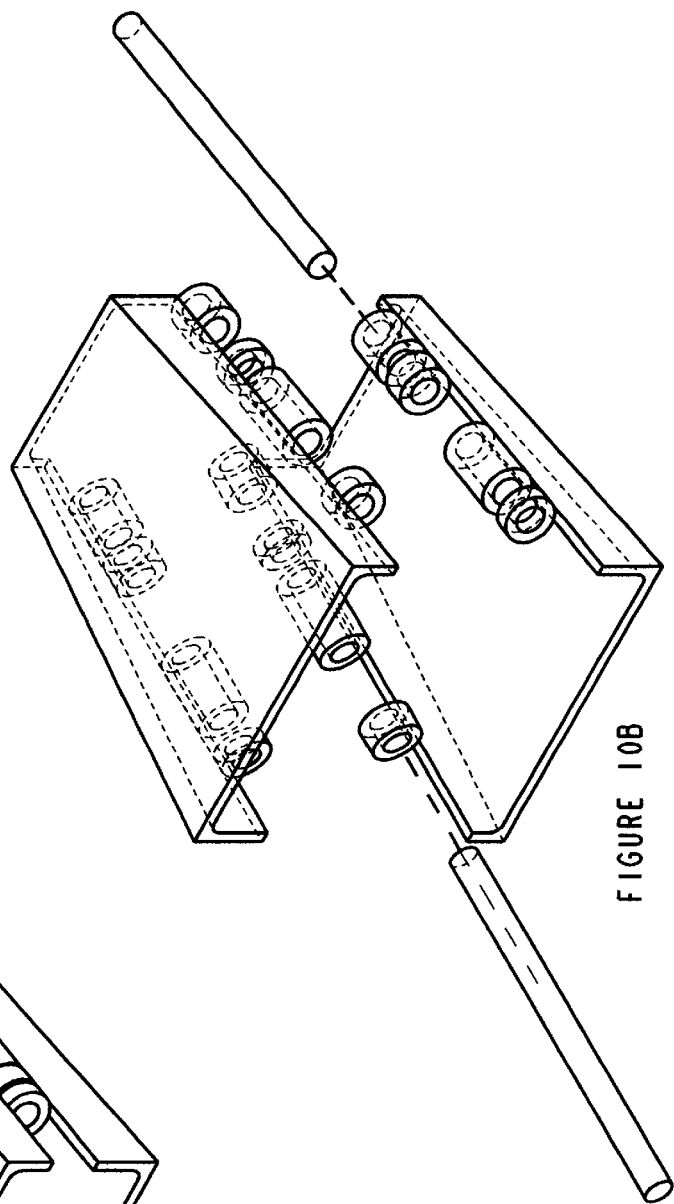
FIG. 10B is an exploded isometric view of the embodiment shown in FIG. 10A
Figure 10A:
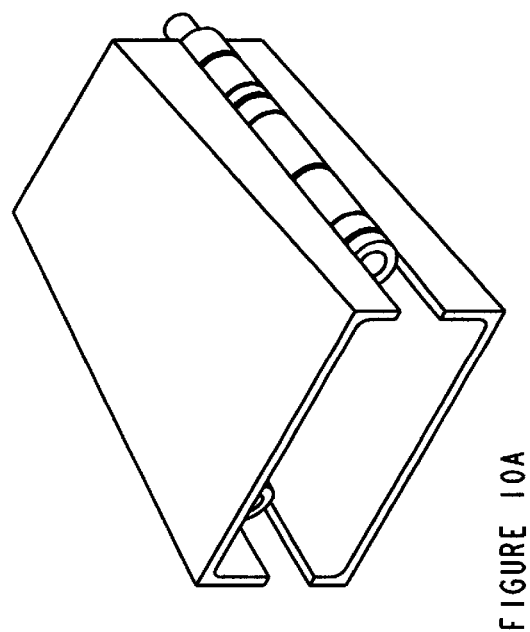
FIG. 10A is an isometric view of another embodiment of the device.

Other embodiments of the device are created by varying the relationship of the base tube element set alignment axes 20 and 21 within the base member assembly, and creating a cooperating arrangement of the coupling member tube element set alignment axes 28 and 29 within the coupling member 11. FIG. 8A, FIG. 8B and FIG. 8C show an embodiment of the device wherein the base member 10 is trapezoidal in shape and the tube element set alignment axes 20 and 21 are coplaner, but not parallel. FIG. 9A, FIG. 9B and FIG. 9C show an embodiment of the device wherein the base member tube element set alignment axes 20 and 21 lie in parallel planes, but are not coplaner. FIG. 10A, FIG. 10B and FIG. 10C show an embodiment of the device wherein the base member tube element set alignment axes 20 and 21 are not parallel and do not lie in parallel planes.

The embodiments of the device may be used where it is desirable to detachably couple two load bearing members, while providing the security functionality of said device. An example is shown in FIG. 11A, wherein a ball coupler 31 and a trailer tongue structure 32 are detachably coupled to a trailer 39. Referring to FIG. 11B, when the device is uncoupled, the ball coupler 31 is removed and the trailer is rendered untowable.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A coupling device incorporated by a trailer to detachably couple a tongue containing a ball coupler, wherein said coupling device comprises:

a base member, a coupling member and two coupling pins; said base member comprising a first base plate and a security feature attached thereto, said security feature comprising a first pair of tube element sets, each of said tube element sets of the first pair comprising a plurality of hollow tube elements of equal internal diameters, said internal diameters sized to insert one of said coupling pins, said tube elements being coaxially aligned along the respective center axis of their respective tube element set of the said security feature, said tube elements being of varied lengths and spacing along the respective center axis of its respective tube element set of the said security feature and end surfaces of said tube elements being normal to the respective center axis of its respective tube element set of the security feature;

said coupling member comprising a second base plate and a complimentary security feature attached thereto, said complimentary security feature comprising a second pair of tube element sets, each of said tube element sets of the second pair comprising a plurality of hollow tube elements of equal internal diameters, said internal diameters sized to insert one of said coupling pins, said tube elements coaxially aligned along the respective center axis of their respective tube element set of the complimentary security feature, said tube elements being of lengths and spacing along the respective center axis of its respective tube element set of said complimentary security feature to mesh with the respective tube elements of said security feature tube element sets of said first base member when said coupling member is assembled to said base member, said complimentary security feature tube element end surfaces being normal to the respective center axis of its respective tube elements of the complimentary security feature; and said coupling pins used to join said base member to said coupling member by insertion of said pin through the center diameters of said security feature tube elements of said base member and said complimentary security feature tube elements of said coupling member, when said members are assembled and the respective security feature tube element sets mesh and are coaxially aligned.

2. The coupling device of claim 15, wherein end surfaces of said tube elements of said security feature of said first base member are beveled at an angle to the respective center axis of its respective tube element set of said security feature, and end surfaces of said complimentary security feature tube elements of said coupling member are beveled at an angle parallel to the respective end surface of said security feature tube element set to mesh with the respective security feature tube elements of said base member.

3. The coupling device of claim 15, wherein said trailer incorporates a detachably coupled structure comprising trailer safety chains and wherein the coupling device allows only an original detachably coupled structure to be coupled to said trailer, thereby deterring the towing of said trailer by accomplishing removal of said detachably coupled structure and remote storage thereof when said trailer is not in use.

* * * * *